Patented Nov. 26, 1929

1,737,114

UNITED STATES PATENT OFFICE

SHELDON B. HEATH, OF MIDLAND, MICHIGAN, ASSIGNOR TO THE DOW CHEMICAL COMPANY, OF MIDLAND, MICHIGAN, A CORPORATION OF MICHIGAN

METHOD OF MAKING MAGNESIUM ARSENATE

No Drawing.   Application filed December 11, 1924.   Serial No. 755,159.

Certain of the advantages inhering in magnesium arsenate as an insecticide, as well as one method of making the same, will be found disclosed in U. S. Patent No. 1,344,018 to E. O. Barstow, dated June 22, 1920, such method consisting broadly in bringing together magnesium hydroxide suspended in water and a watery solution of arsenic acid. The later Patent No. 1,466,983 to E. O. Barstow and Paul Cottringer, dated September 4, 1923, points out certain difficulties encountered in such previously patented method and discloses how these may be overcome by conducting the reaction between such magnesium hydroxide and arsenic acid in an autoclave at a temperature above the boiling point of water. A product may be manufactured by this autoclave process having a water soluble $As_2O_5$ content of less than two-tenths (0.2) per cent which is entirely satisfactory for insecticidal use and has given exceptionally good results in combating certain difficultly controllable insect pests such as the Mexican bean beetle. However, the product obtained by such autoclave process has not been sufficiently fluffy or bulky for its weight, occupying an average of 60 cubic inches per pound, whereas a cubic inch per pound figure of approximately 90 would be preferable. The object of the present invention, accordingly, is to improve such autoclave process in such manner that while still obtaining a product having the prescribed minimum content of water soluble arsenic, will have a fluffiness of around 90 cubic inches per pound. To this end, the invention, then, consists of the steps hereinafter fully described and particularly pointed out in the claims, it being understood that changes may be made in such steps without departing from the spirit of the invention.

In carrying out the present improved process, a slurry of magnesium hydroxide, $Mg(OH)_2$, in water is mixed with sufficient arsenic acid solution to form a product of the desired arsenic, $As_2O_5$, content. Then 15 per cent of the amount of caustic alkali equivalent to the arsenic acid used is added, as calculated in molecular proportions from the following equation, viz:—

(1)  $3NaOH + H_3AsO_4 \rightarrow Na_3AsO_4 + 3H_2O$.

The resulting slurry, running 6 or 7 pounds of solids per cubic foot, is thereupon put in an autoclave and brought up to a temperature of approximately 180 degrees C. as rapidly as possible, good agitation being provided. The contents are held at the temperature indicated until an analysis shows the water soluble arsenic content to be less than two-tenths (0.2) per cent. The contents of the autoclave are then removed, filtered and washed with water to remove the excess caustic and the resultant filter cake worked up to a powder in apparatus similar to that used for powdered lead arsenate. The resultant powder will be found to have the desired degree of fluffiness and in other respects to be admirably suited for insecticidal use. The reactions involved in the process may be represented by the following equations, viz:—

(2)  $Mg(OH)_2 + H_3AsO_4 \xrightarrow{\text{At room temperature and pressure}} MgHAsO_4 + 2H_2O$

(3)  $MgHAsO_4 + 2NaOH \xrightarrow{\substack{Mg(OH)_2 \text{ is more insoluble} \\ \text{than } MgHAsO_4}} Mg(OH)_2 + Na_2HAsO_4$

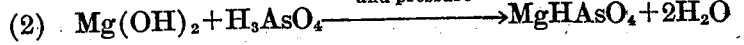

(4)  $3MgHAsO_4 + Na_2HAsO_4 \xrightarrow{\substack{\text{Under autoclave} \\ \text{conditions described}}} Mg_3(AsO_4)_2 + 2NaH_2AsO_4$

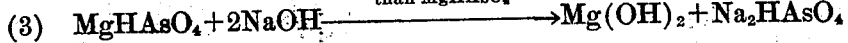

(5)  $2NaH_2AsO_4 + Mg(OH)_2 \xrightarrow{\substack{\text{Under autoclave} \\ \text{conditions}}} Na_2HAsO_4 + MgHAsO_4$

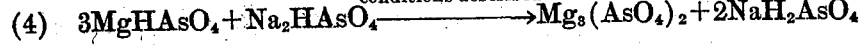

(6)  $Na_2HAsO_4 + 3MgHAsO_4 \xrightarrow{\substack{\text{Under autoclave} \\ \text{conditions}}} Mg_3(AsO_4)_2 + 2NaH_2AsO_4$

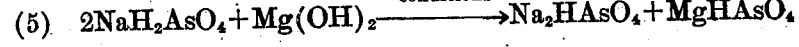
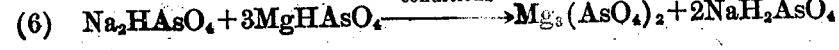

The small amount of caustic alkali (approximately 15 per cent of the amount chemically equivalent to the arsenic), which is thus added to the mixture before introduction into the autoclave, apparently acts as a carrier for the arsenic acid or at least serves as a means for obtaining a higher soluble arsenic concentration in the autoclave. As a result, the reaction proceeds faster and the resultant magnesium arsenate, $Mg_3AsO_4$, is mostly in the form of needle crystals which probably accounts for the higher number of cubic inches per pound.

Potassium hydroxide is of course the equivalent of sodium hydroxide in the reactions involved; the term "caustic" is accordingly to be understood as including caustic potash as well as caustic soda. The amount of such caustic may, moreover, be increased over or decreased from the prescribed 15 per cent depending on whether a more or less fluffy product is desired.

It will also be understood that magnesium oxide, $MgO$, may be substituted for the hydroxide. In fact I may react between magnesium chloride, or other soluble magnesium salt, and sodium arsenate, just as described in the aforesaid Patent No. 1,344,018, adding caustic in the amount hereinbefore set forth with the same advantageous results. If instead of sodium arsenate ($Na_3AsO_4$), the acid sodium arsenate ($Na_2HAsO_4$), which is the commercial "arsenate of soda," be employed with such soluble magnesium salt, the amount of caustic employed will of course have to be increased sufficiently to neutralize the acid component of such arsenate, and the same is true if arsenic acid be employed in this last mentioned reaction.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of making magnesium arsenate, the step which consists in autoclaving magnesium acid arsenate in the presence of caustic alkali or alkali arsenate at a temperature above the atmospheric boiling point of water.

2. In a method of making magnesium arsenate, the steps which consist in reacting between arsenic acid and a magnesium compound reactable therewith in the presence of an alkali metal compound in amount less than the equivalent of the former, and subjecting the resulting mixture in an autoclave to a temperature above the atmospheric boiling point of water.

3. In a method of making magnesium arsenate, the step which consists in reacting between arsenic acid and magnesium hydroxide in the presence of an alkali metal compound in amount less than the equivalent of the former, at a temperature above the atmospheric boiling point of water.

4. A method of making magnesium arsenate, which includes converting magnesium acid arsenate to a normal arsenate by autoclaving at a temperature above the atmospheric boiling point of water, in the presence of an alkali metal compound.

5. A method of making magnesium arsenate, which includes converting magnesium acid arsenate to normal arsenate by autoclaving at a temperature of approximately 180° C., in the presence of an alkali metal compound in amount less than the equivalent of the former.

6. In a method of making magnesium arsenate, the steps which consist in reacting between arsenic acid and magnesium hydroxide in the presence of sodium hydroxide equal in amount to approximately fifteen (15) per cent of that theoretically required to convert such acid to sodium arsenate, at a temperature above the atmospheric boiling point of water.

7. In a method of making magnesium arsenate, the steps which consist in reacting between arsenic acid and magnesium hydroxide in the presence of sodium hydroxide equal in amount to approximately fifteen (15) per cent of that required to convert such acid to sodium arsenate and subjecting the resulting mixture in an autoclave to a temperature above the atmospheric boiling point of water.

8. In a method of making magnesium arsenate, the steps which consist in reacting between arsenic acid and magnesium hyroxide in the presence of sodium hydroxide equal in amount to approximately fifteen (15) per cent of that required to convert such acid to sodium arsenate and subjecting the resulting mixture in an autoclave to a temperature of approximately 180° C.

Signed by me this 5th day of December, 1924.

SHELDON B. HEATH.